Sept. 29, 1942.  F. OKOLICSANYI  2,296,944
TELEVISION RECEIVER
Filed June 24, 1940   2 Sheets-Sheet 1
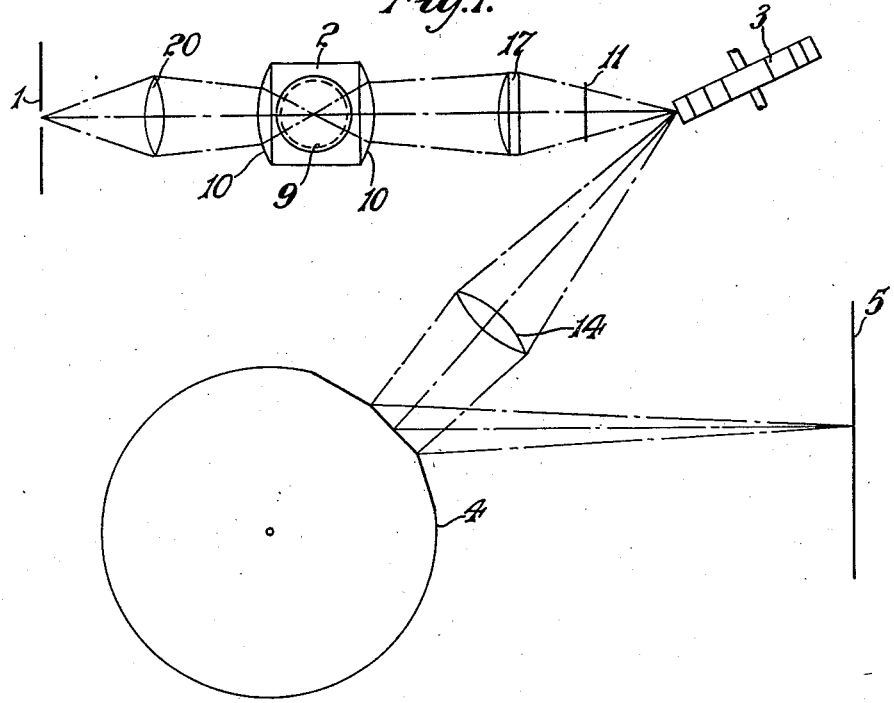
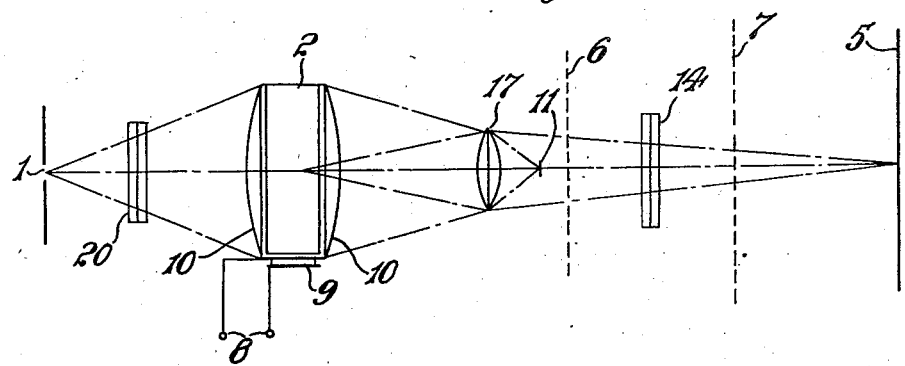
Inventor:
Ferenc Okolicsanyi,
By Cushman, Darby & Cushman
Attorneys.

Sept. 29, 1942.   F. OKOLICSANYI   2,296,944
TELEVISION RECEIVER
Filed June 24, 1940   2 Sheets-Sheet 2
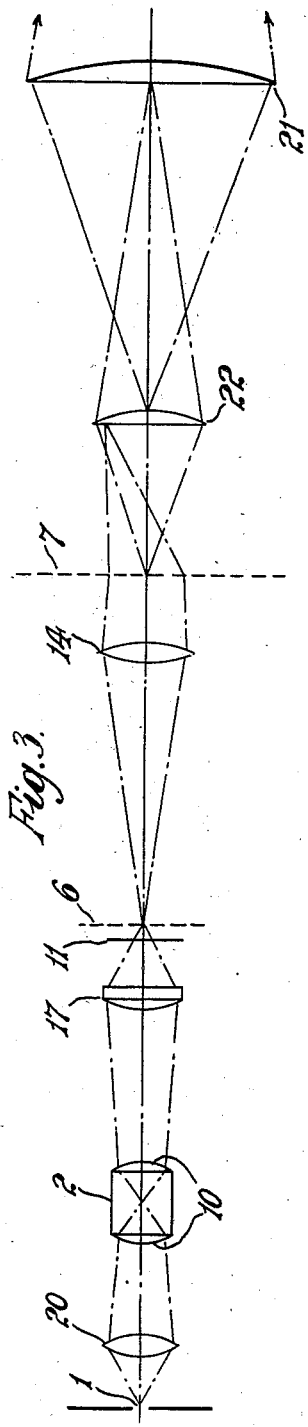
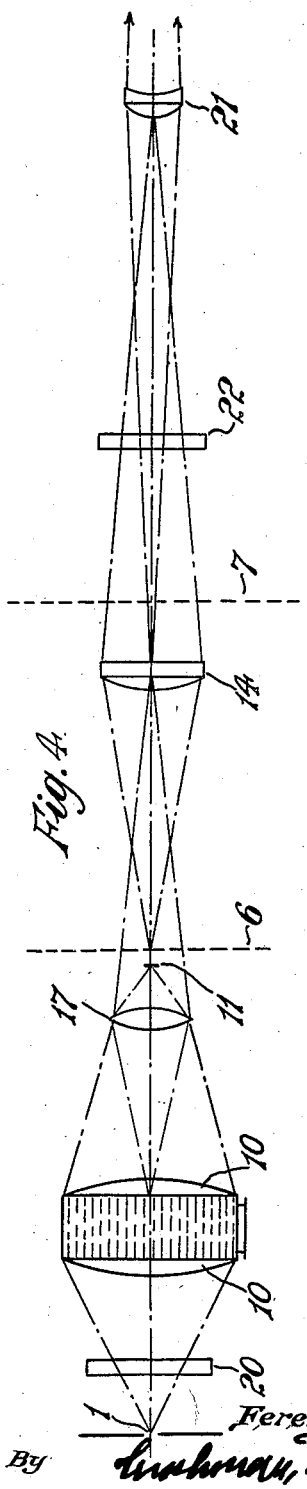

Patented Sept. 29, 1942

2,296,944

UNITED STATES PATENT OFFICE 2,296,944

TELEVISION RECEIVER

Ferenc Okolicsanyi, Kensington, London, England

Application June 24, 1940, Serial No. 342,183
In Great Britain July 3, 1939

13 Claims. (Cl. 178—7.6)

The present invention relates to television receivers employing a supersonic wave light modulating device, a high speed scanning member in the form of a mirror drum, and a low speed scanning member which can be either a mirror drum or an oscillating mirror.

Such receivers have a rather short projection distance; for example, to produce a satisfactory picture having a length of eleven feet, the projection distance cannot exceed greatly eighteen feet. When the receiver is installed in a cinema this short projection distance is a disadvantage since the receiver must be placed either behind the screen or in the auditorium, instead of being placed in the projection booth. It is an object of the present invention to enable such receivers to operate with greatly increased projection distances of the order of 100 feet so that they can operate from the projection booth of a cinema.

A typical example of such a receiver in which a mirror drum is employed as the low speed scanner is shown in Figs. 1 and 2 of the accompanying diagrammatic drawings, in which Fig. 1 is a side elevation and Fig. 2 a plan of the receiver. The drawings are taken from Figs. 3 and 4 of British Patent No. 496,964.

Referring to Figs. 1 and 2, the receiver comprises an illuminated aperture 1, a supersonic wave light modulator cell 2, a high speed mirror drum 3, a low speed mirror drum 4 and a receiving screen 5. In Fig. 2 the mirror drums 3 and 4 have been omitted for the sake of simplicity, the positions at which reflection from their mirror surfaces takes place in the path of the light beam being indicated by the dotted lines 6 and 7 respectively. A carrier wave modulated in amplitude with the picture signals is applied to the terminals 8 connected with the electrodes of a piezo electric crystal 9, whereby travelling supersonic waves modulated in amplitude are produced in the liquid of the cell 2.

In the plane of Fig. 2 the lenses 10 on each side of the cell together with the line length focussing lens 17 focus an image of the aperture 1 on the bar 11, so that no direct light from the aperture can pass the bar. The light which is diffracted by the action of the waves and which passes the bar is focussed by the lens 17 on to the screen 5, whereby a cylindrical image of the moving waves in the liquid is formed on the screen 5 in the plane of Fig. 2. In the plane of Fig. 1 an image of the aperture 1 is formed on the surface of the mirror drum by means of the lens 17, which has a different power in this plane from the power it has in the plane of Fig. 2 (i. e. the lens 17 is sphero-cylindrical). An image of this illuminated surface is formed on the screen 5 in the plane of Fig. 1 by means of the cylindrical lens 14 (the line width focussing lens). Thus the scanning spot on the screen 5 is in the form of a strip of light having its longer dimension in the plane of Fig. 2, and containing moving images of the waves in the cell 2. This strip is swept in the directon of its length across the screen by means of the mirror drum 3, the arrangement being such that this movement serves to immobilize the moving images of the waves with respect to the screen. The low speed component of scanning is effected by sweeping the strip in the direction of its width by means of the mirror drum 4. With the receiver shown, the projection distance for a picture having a width of 11 feet is only about 18 feet, i. e. about one sixth of that required.

Considering the action of the receiver in the line scanning direction, it is clear that for a given picture size, the projection distance will be determined by the scanning angle i. e. the angle between two adjacent faces of the high speed drum. To keep the picture size constant and to increase the projection distance by a factor $n$ it is necessary to decrease this angle by a factor $n$ which results in an increase in the number of mirror faces by the same factor. Owing to the necessity of immobilizing the images of the waves in the cell it is not possible to increase the number of faces without increasing their size in the same ratio; thus the diameter of the drum becomes $n^2$ times larger and this is too great for the drum to be driven at the necessary high speed. It is also impossible to make a drum with a large number of faces with any degree of accuracy, due to the smaller angle between adjoining faces. Consequently, in such a receiver the ratio of the projection distance to the picture size is fixed within narrow limits by the high speed mirror drum.

According to the present invention this ratio is increased by arranging that the immobilized image of the picture line is formed, not on the receiving screen, but in an intermediate position, and an astigmatic projection lens system forms an image of the immobilised picture line on the receiving screen. Preferably, it is arranged that the line width focussing lens referred to above acts at the same time as a field lens placed in this intermediate position, by giving it a suitable curvature in the line scanning direction.

This intermediate line image, except for the fact that the definition is in the line scanning direction only, is the full equivalent of any diapositive such as a lantern slide, and hence can be projected to any distance with any size by the usual projection technique.

It is now necessary to consider the action of the receiver in the frame scanning direction. As before, for a given picture size, the projection distance is determined by the scanning angle, and, generally speaking, the same difficulties are encountered if an attempt is made to increase the projection distance merely by reducing the scanning angle, and therefore the same method of solution must be employed, namely the production of a second intermediate image having definition in the frame scanning direction. Certain exceptional cases arise, however, in which an alternative solution is possible. In the first place, in view of the low speed of frame scanning, an oscillating mirror working with a saw-toothed movement can be employed instead of a mirror drum. With such a mirror, it is clear that the reduction of the scanning angle can be achieved without increasing the size of the mirror since these two quantities are not connected in any way in the case of a single mirror. Furthermore a reasonable increase in the size of a single mirror is not objectionable, and therefore this size can be increased so that the mirror can transmit the quantity of light necessary for the increased projection distance. Secondly, provided that the required increase in projection distance is small, and that some method of beam transformation is employed, it is possible to use a mirror drum with the required small scanning angle and with small faces, without the diameter of the drum becoming impossibly large. Generally speaking, however, it is preferable, especially when using mirror drums, not to attempt to reduce directly the scanning angle.

Therefore, according to a feature of the invention, in addition to forming, in the line scanning direction, an intermediate image of a picture line preferably in the plane of a first field lens, the line width focussing lens is adapted to focus, in the frame scanning direction, an intermediate image of an illuminated aperture at or near to the surfaces of the high speed drum preferably on to the plane of a second field lens situated between the low speed scanning member and the said astigmatic projection lens system, this second field lens being adapted to focus into the projection lens system an image of the illuminated surface of the low speed scanning member, and the projection lens system being adapted to focus the planes of both the first and second field lenses on to the receiving screen. Preferably the aperture referred to above is constituted by the illuminated surfaces of the high speed drum themselves.

In order to render clearer the nature of the invention a preferred embodiment will now be described by way of example with reference to a television receiver employing two separate mirror drums and adapted to throw a picture having a width of about eleven feet at a distance of 120 feet from the receiver. This receiver is illustrated in Figs. 3 and 4 of the accompanying drawings. Fig. 3 corresponds to Fig. 1 and Fig. 4 to Fig. 2, but in both drawings the scanning devices have been indicated by dotted lines only.

Up to the high speed scanner (indicated in both Figs. 3 and 4 by the dotted line 6) the arrangement is the same as in Figs. 1 and 2, with the exception that the power of the line length focussing lens 17 is increased, so that it focusses not beyond the low speed drum 7, but between the two drums 6 and 7. It focusses an immobilised image of the waves on the surface of the line width focussing lens 14, which has power in the line scanning plane Fig. 4 as well as in the frame scanning plane Fig. 3 and which is distant about 30 cms. from the high speed drum 16. The immobilised picture line formed on the lens 14 has a length of about 16 cms. This lens 14 in the line scanning plane Fig. 4 focusses an image of the high speed scanner on to a final astigmatic projection lens 21, which focusses an image of the plane of lens 14 on to the receiving screen (which is not shown in the diagram). Thus it will be seen that the lens 14 in the plane of Fig. 4 acts as a field lens for an intermediate immobilised image of the cell, and projects the light from this image into the final projection lens 21. In the plane of the lens 14 the immobilised image has definition only in the plane of this figure, but none in the plane of Fig. 3. In Fig. 3 the line width focussing lens 14 forms an image of the high speed scanner not on the screen as in Fig. 1 but in the plane of a cylindrical field lens 22, this image being the intermediate frame image, which has a length of about 12 cms. The lens 22 projects an image of the faces of the low speed drum 7 on to the lens 21, which in its turn focusses an image of the intermediate image on the lens 22 on to the projection screen.

The dimensions of the system are as follows:

| | Centimeters |
|---|---|
| From lens 17 to drum 6 | 2.3 |
| From drum 6 to lens 14 | 30 |
| From lens 14 to drum 7 | 10 |
| From drum 7 to lens 22 | 23 |
| From lens 22 to lens 21 | 134 |

These dimensions are not critical.

The projection lens system 21 consists of two crossed cylindrical lenses of different powers, preferably cemented together, and is situated about 134 cm. from the frame intermediate image and about 167 cm. from the line intermediate image. In the line scanning direction the appropriate cylindrical lens has a width of about 1.7 cm. and works at an aperture of about F. 50. This limitation in the aperture is imposed by the physical characteristics of the supersonic cell and is inherent in any receiver employing this type of light modulator. Owing to this small aperture little or no optical correction of this lens is necessary. In the frame scanning direction the appropriate cylindrical lens has a width of about 60 cms. and works at an aperture of about F. 2. At first sight it would appear that considerable optical correction is required at this wide aperture, and that this fact, combined with the large size of the lens, would present difficulties from the points of view of expense and manufacture. Actually this is not so, for this lens is viewing an object (the frame intermediate image) of only 12 cm. length at a distance of 134 cm., and due to this very limited field of view very little optical correction is necessary. Furthermore, since this lens is in a focussing plane it can be built up of several segments, or it can be built in the form of a cylindrical Fresnel lens, thus reducing its thickness.

Certain modifications of this arrangement are possible. For example, the projection lens system obviously can be constituted by a single lens having the dimensions given above (1.7 x 60 cms.) and having the necessary different curvatures in the two planes, or it may be constituted by two separated crossed cylindrical lens having suitable curvatures. The line intermediate image need not be formed in the plane of the line width focussing lens but can occupy other planes between the two mirror drums. This modification may result in an extra lens, however, since the line width focussing lens can no longer act as the field lens for the line intermediate image. Also the number of faces of the low speed drum can be reduced and their size correspondingly increased with advantage. This gives a larger size for the frame intermediate image, and consequently the size of the second field lens and the projection lens must be increased in the frame scanning direction. If such larger lens sizes can be tolerated, such an increase in the scanning angle of the low speed drum is an advantage since it results in an increase in light without impairing the definition in the frame scanning direction.

The area of the exit pupil of this receiver is given by the area of the final projection lens and this is approximately equal to 36 times the exit pupil area of the standard receiver adapted for an 18 foot projection distance. At the same time the scanning angle is reduced by a factor 6 in each direction so that the solid angle of the emergent light is reduced by a factor 36. Consequently the total light grasp (exit pupil area X solid angle of divergence of the light cone) of the two receivers are the same.

I claim:

1. A television receiver comprising a light source, a supersonic wave light modulating device, a high speed scanner and a slow speed scanner, a line length optical system for forming, in conjunction with said high speed scanner, an immobilised intermediate image of the waves in said light modulating device, and an astigmatic optical projection system for forming a final image of said intermediate image.

2. A television receiver comprising a light source, a supersonic wave light modulating device, a high speed mirror drum, a slow speed scanner, a line length optical focussing system for forming, in co-operation with said mirror drum, an immobilised intermediate image of the waves in said light modulating device, said image being positioned between said mirror drum and said scanner, a field lens in the plane of said intermediate image, and an astigmatic optical projection system for forming a final image of said intermediate image, said field lens being adapted to focus an image of the faces of said high speed mirror drum on to said projection system.

3. A television receiver comprising a light source, a supersonic wave light modulating device, a high speed mirror drum, a slow speed scanner, an astigmatic line length optical system for forming, in co-operation with said mirror drum, an immobilized image of the plane of said light modulating device having definition in the line scanning direction, and an astigmatic projection lens system for forming a final image from said intermediate image.

4. A television receiver comprising the following elements arranged in the order mentioned; a light source, a first lens systems, a supersonic wave light modulating device, an astigmatic line length focussing lens, an optical stop, a high speed mirror drum, a first astigmatic field lens, a low speed mirror drum, a second astigmatic field lens, and an astigmatic projection lens; said lenses being arranged to focus as follows: in the line scanning direction, said first lens system forms an image of the light source on to the optical stop, said line length focussing lens forms an image of the plane of the modulating device on to the first field lens, said first field lens forms an image of the high speed mirror drum on to the projection lens, and said projection lens forms a final image of the plane of the first field lens: and in the frame scanning direction, said first lens system forms an image of the light source in the light modulating device, said line length focussing lens forms an image of the modulating device on to the high speed mirror drum, said first field lens forms an image of said mirror drum on to said second field lens, said second field lens forms an image of the high speed scanner on to said projection lens and said projection lens forms a final image of said second field lens.

5. A television receiver comprising a light source, a supersonic wave light modulating device, a high speed mirror drum and a low speed scanner, optical means for forming a first intermediate immobilised image having definition in the line scanning direction, optical means for forming a second intermediate image having definition in the frame scanning direction, said intermediate images lying in different planes, and an optical projection system for forming a final image from said intermediate images.

6. A television receiver comprising a light source, a supersonic wave light modulating device, a high speed mirror drum and a low speed scanner, optical means for forming a first intermediate immobilised image having definition in the line scanning direction, optical means for forming a second intermediate image having definition in the frame scanning direction, said intermediate images lying in different planes, a first field lens in the plane of said first intermediate image which is formed between said mirror drum and said scanner, a second field lens in the plane of said second intermediate image which is formed beyond said scanner, and an astigmatic optical projection system for forming a final image from said intermediate images, said first field lens forming in the line scanning direction an image of said mirror drum on said projection lens and said second field lens forming in the frame scanning direction an image of said scanner on said projection lens.

7. A television receiver according to claim 1 wherein said slow speed scanner comprises a mirror drum.

8. A television receiver according to claim 1 wherein said slow speed scanner comprises an oscillating mirror.

9. A mechanical television receiver suitable for projecting an image over a long distance, said receiver comprising a supersonic wave light modulating device, a high speed scanner and a low speed scanner, and an optical system for forming an intermediate immobilised image of the waves in said modulating device, and having definition in the line scanning direction, and an optical projection system for projecting a final image of said intermediate image.

10. A television receiver comprising a light source, a supersonic wave light modulating device, means for immobilising images of waves in said device, an astigmatic optical system for forming, in conjunction with said means, an intermediate image of said device, and an astigmatic optical projection system for forming a final image of said intermediate image.

11. A receiver according to claim 10 where said image has definition in the line scanning direction.

12. A receiver according to claim 10 wherein said image has definition in the frame scanning direction.

13. A television receiver comprising a supersonic wave light modulating device, line length focussing means, a slow speed scanning member, line width focussing means for focussing with said scanner an intermediate frame image having definition in the frame scanning direction, and an optical projection system for forming a final frame image of said intermediate frame image.

FERENC OKOLICSANYI.